(12) United States Patent (10) Patent No.: US 10,594,844 B2
Chen et al. (45) Date of Patent: Mar. 17, 2020

(54) METHOD AND SYSTEM FOR WIRELESS NETWORK BILATERAL ACCELERATED TRANSMISSION

(71) Applicant: WANGSU SCIENCE & TECHNOLOGY CO., LTD., Shanghai (CN)

(72) Inventors: Weilong Chen, Shanghai (CN); Wensheng Chen, Shanghai (CN); Xiaobin Chen, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 32 days.

(21) Appl. No.: 15/770,314

(22) PCT Filed: Feb. 21, 2017

(86) PCT No.: PCT/CN2017/074219
§ 371 (c)(1),
(2) Date: Apr. 23, 2018

(87) PCT Pub. No.: WO2018/076580
PCT Pub. Date: May 3, 2018

(65) Prior Publication Data
US 2019/0075189 A1 Mar. 7, 2019

(30) Foreign Application Priority Data
Oct. 25, 2016 (CN) .......................... 2016 1 0938700

(51) Int. Cl.
*H04L 29/06* (2006.01)
*H04L 5/14* (2006.01)
(Continued)

(52) U.S. Cl.
CPC .......... *H04L 69/164* (2013.01); *H04L 5/1423* (2013.01); *H04L 43/10* (2013.01);
(Continued)

(58) Field of Classification Search
CPC ..... H04L 69/164; H04L 5/1423; H04L 43/10; H04W 8/26; H04W 28/0273; H04W 36/18; H04W 60/005
See application file for complete search history.

(56) References Cited

U.S. PATENT DOCUMENTS 5,371,734 A * 12/1994 Fischer ............. H04W 52/0274
370/311
5,912,888 A * 6/1999 Walsh ..................... H04L 12/28
370/355
(Continued)

FOREIGN PATENT DOCUMENTS

EP 2930899 * 10/2015
EP 2930899 A1 10/2015

OTHER PUBLICATIONS

Yokokura, Y.,Katsura, S., & Ohishi K., 'bilateral Controlling Using Master/Slave Simulator for Haptic Communication. IEEJ Translations on Industry Application (Published in 2010).*
(Continued)

*Primary Examiner* — Afsar M Qureshi
(74) *Attorney, Agent, or Firm* — Anova Law Group, PLLC

(57) ABSTRACT

A method and system for wireless network bilateral accelerated transmission are provided. The method comprises constructing, by a client and a server, a bilateral accelerated transmission protocol based on a user datagram protocol; and performing, by the client and the server, data transmission based on the bilateral accelerated transmission protocol.

7 Claims, 4 Drawing Sheets

(51) Int. Cl.
*H04L 12/26* (2006.01)
*H04W 8/26* (2009.01)
*H04W 28/02* (2009.01)
*H04W 36/18* (2009.01)
*H04W 60/00* (2009.01)

(52) U.S. Cl.
CPC ......... *H04W 8/26* (2013.01); *H04W 28/0273* (2013.01); *H04W 36/18* (2013.01); *H04W 60/005* (2013.01)

(56) References Cited

U.S. PATENT DOCUMENTS

| | | | | |
|---|---|---|---|---|
| 7,120,666 | B2* | 10/2006 | McCanne | H04L 67/2828 709/203 |
| 7,428,753 | B2* | 9/2008 | Engle | H04L 63/0272 709/219 |
| 2012/0069829 | A1* | 3/2012 | Cote | H04L 47/27 370/338 |
| 2014/0059168 | A1* | 2/2014 | Ponec | H04L 67/02 709/217 |
| 2014/0258366 | A1* | 9/2014 | L'Heureux | H04L 29/08 709/203 |
| 2016/0036712 | A1 | 2/2016 | Weston et al. | |
| 2016/0294986 | A1* | 10/2016 | Zhang | H04L 69/08 |

OTHER PUBLICATIONS

The European Patent Office (EPO) the Extended European Search Report for 17864829.1(PCT/CN2017/074219) Nov. 2, 2018 8 Pages.

* cited by examiner

METHOD AND SYSTEM FOR WIRELESS NETWORK BILATERAL ACCELERATED TRANSMISSION

CROSS-REFERENCES TO RELATED APPLICATIONS

This application is a national phase entry under 35 U.S.C § 371 of International Application No. PCT/CN2017/074219, filed on Feb. 21, 2017, which claims priority of Chinese Patent Application No. 201610938700.4 filed with the State Intellectual Property Office of P. R. China on Oct. 25, 2016, the entire contents of all of which are incorporated herein by reference.

FIELD OF THE DISCLOSURE

The present disclosure relates to the field of wireless network transmission and, more particularly, relates to a method and system for wireless network bilateral accelerated transmission.

BACKGROUND

The protocols used by an internet transport layer are primarily a transmission control protocol (TCP) and a user datagram protocol (UDP). While the former one is a reliable transmission protocol based on connection and has functions such as traffic control and congestion control, the later one is a connectionless and unreliable transmission protocol. Current network transport mainly uses the transmission control protocol. Before transmitting data, the sending end and the receiving end have to reach an agreement on information related to a transmission control protocol connection, which needs to be negotiated and established via the three-handshake mechanism of the transmission control protocol.

An existing method of transmission control protocol connection is illustrated in FIG. 1. First, step S101 is performed at a client, where the client sends a handshake signal (SYN information) to a server. After the server receives the SYN information, step S102 is performed, where the server sends SYN+ACK information to the client, indicating that the server receives the SYN information. After the client receives the information sent from the server, step S103 is finally performed, where ACK is sent to the server, thus confirming that the data sent from the server is received. When the client and the server need to perform data transmission, step S104 is further performed, and the client sends a data transmission request to the server. In step S105, after receiving the transmission request sent from the client, the server performs first window transmission with the client.

At the beginning of the establishment of the transmission control protocol connection between the client and the server, both the client and the server may have no idea what the available bandwidth is for the network link. Accordingly, a detection and estimation mechanism is first needed, and the transmission rate needs to be adjusted dynamically based on the continuous change in the network status. The method used by the transmission control protocol to detect and estimate the network bandwidth is a slow start mechanism, and the sending end may configure an initial value for the transmission window when the transmission control protocol connection is established. The initial value is the maximum data amount that the sending end may send before receiving the acknowledgement packet (ACK) replied by the receiving end. Later, every time an acknowledgement packet is received, the slow start mechanism may ask the sending end to add a transmission control protocol packet section to the transmission window. Accordingly, two new transmission control protocol packets may be sent, and such a growing process may continue until the transmission window reaches a threshold value or packet loss occurs. The slow start stage of the transmission control protocol is often called an "exponential growth" stage because the data amount transmitted by the transmission control protocol connection approaches rapidly towards the actual available bandwidth of the network link.

Compared to the conventional fixed line network (cable network), the major features of the wireless network (2G/3G/4G/WIFI) are as follows:

(1) The bandwidth is limited and bandwidth variance in different networks is large; (2) the time delay variation is large, and the network switch is relatively frequent; (3) random packet loss occurs frequently caused by signal attenuation or noise disturbance. If being an important factor that restricts the performance of the fixed line network connection, the time delay may be an even more important performance bottleneck for wireless connection because the time delay of the wireless network is longer than that of the fixed line network. Because the time delay of the wireless network is long and the network switch may occur, once network switch occurs, the client of the transmission control protocol has to re-establish connection with the server in order to continue data transmission. If the network switch is relatively frequent, the cost spent on establishing the transmission control protocol connection between the client and the server may be relatively high.

No matter how large the network bandwidth is, each transmission control protocol connection has to undergo the slow start stage. That is, the transmission control protocol connection may not entirely utilize the maximum bandwidth of the network link at the very beginning. For the transmission of a large data amount request, because the transmission time is relatively long, the influence of the slow start stage may be relatively small. But for the transmission of a small data amount request, often situations where the request is completed before the transmission window reaches the threshold value occur. The slow start limits the available transmission amount, which is undesired for the transmission of small data amount.

To shorten the period of time experienced by the slow start process and to decrease the probability of network congestion, a relatively useful method is to configure different initial transmission windows based on the network type of the transmission control protocol connection. For the network with a relatively large bandwidth, an appropriate increase in the initial transmission window may be particularly desired for enhancing the transmission of the small data amount. But the transmission control protocol fails to configure an initial transmission window individually for each connection, and all connections have to share the same initial window. That is, for the transmission control protocol connection, the 3G/4G network with a relatively large bandwidth has to configure the same initial transmission window as the 2G network with a relatively small bandwidth, which is highly undesired for the transmission of small request under the 3G/4G network.

As such, the issues in existing techniques are: (1) connection has to be established between the client and the server after three handshakes, resulting in a relatively high time cost for establishing a transmission control protocol connection; (2) the transmission control protocol connection fails to configure corresponding initial windows for different networks; (3) the transmission control protocol connection needs to be re-established when the network switches.

BRIEF SUMMARY OF THE DISCLOSURE

To solve existing technical issues, embodiments of the present disclosure provides a wireless network bilateral accelerated transmission method and system thereof. The technical solutions are as follows:

In the first aspect, a wireless network bilateral accelerated transmission method is provided and comprises the following steps:

Constructing, by a client and a server, a bilateral accelerated transmission protocol based on a user datagram protocol; and Performing, by the client and the server, data transmission based on the bilateral accelerated transmission protocol.

Further, specific steps of constructing, by the client and the server, a bilateral accelerated transmission protocol based on user datagram protocol further comprise:

Registering, by the client, with the server, and acquiring, by the client, a universally unique identifier of the client from the server; and Sending, by the server, the universally unique identifier of the client to the client, and simultaneously, configuring, by the server, an initial transmission window and other protocol parameters based on the network type of the client.

Further, the specific steps of performing data transmission, by the client and the server, based on the bilateral accelerated transmission protocol further comprise:

Sending, by the client, a data transmission request comprising the universally unique identifier to the server, and feed backing, by the client, information to the server during a data transmission process; and Receiving, by the server, the data transmission request comprising the universally unique identifier sent by the client, and via the initial transmission window and other protocol parameters configured by the client, performing, by the server, data transmission comprising the universally unique identifier with the client.

Further, the method of configuring the initial transmission window is: for different network types, the initial transmission window is configured to have different values; for a 2G network, the initial transmission window value is configured to be 10; for a 3G network, the initial transmission window value is configured to be 20; for a 4G network, the initial transmission window value is configured to be 30; and for a WIFI network, the initial transmission window value is configured to be 15.

Further, other protocol parameters comprise: a slow start threshold and an initial value of retransmit time-out time.

Further, the wireless network bilateral accelerated transmission method further includes:

When network switch occurs at the client, sending, by the client, new network information to the server;

Receiving, by the server, the new network information sent by the client, and based on the universally unique identifier of the client and the new network information, updating the transmission window corresponding to the client and other protocol parameters at the server; and Continuing to perform, by the client and the server, data transmission comprising the universally unique identifier.

In another aspect, a wireless network bilateral accelerated transmission system is provided, comprising:

a client and a server, where the client and the server construct a bilateral accelerated transmission protocol based on a user datagram protocol and further establish connection based on the bilateral accelerated transmission protocol to perform data transmission.

Further, the client comprises:

a registration module, configured to collect information of the client and register with the server;

a first sending & receiving module connected to the registration module and configured to send information to the server and receive the information sent to the client by the server.

Further, the server comprises;

a configuration module, configured to process registration information of the registration module, generate the universally unique identifier of the client, and configure an initial transmission window and transmission protocol parameters based on the network type of the client; and a second sending & receiving module, connected to the configuration module and the first sending & receiving module, and configured to receive the information sent to the server by the client and send information to the client.

Further, the registration module further comprises: a network sub-module configured to recognize network type information of the client.

Further, the configuration module further comprises: a management sub-module configured to manage information of the client and process update information when the network switches at the client.

Optionally, the client further comprises: an examination module, connected to the first sending & receiving module, and configured to generate a heartbeat packet at designated time and send the heartbeat packet to the server via the first sending & receiving module.

Optionally, the client further comprises: a release module, connected to the second sending & receiving module, and configured to determine an active status of the client based on the heartbeat packet, and allow the second sending & receiving module to release the connection with the first sending & receiving module if the heartbeat packet is not received before timeout.

The advantageous effects brought by technical solutions provided by embodiments of the present disclosure include: the disclosed protocol may configure different initial transmission windows based on different network types of the client, which may not be realized by the transmission control protocol connection. A relatively good effect may be achieved for accelerating data transmission, especially regarding the transmission of small request, thereby reducing the time cost of the detection and estimation of the network bandwidth. The network switch at the mobile terminal may be relatively frequent, and under such situation, the transmission control protocol needs to re-establish connection to continue communication. The disclosed protocol may no longer need to re-establish connection, and thus the time cost of connection re-establishment when the network switches may be reduced.

BRIEF DESCRIPTION OF THE DRAWINGS

To more clearly illustrate technical solutions in embodiments of the present disclosure, the accompanying drawings used for describing the embodiments are briefly introduced hereinafter. Obviously, the accompanying drawings in the following descriptions are only some embodiments of the present disclosure, and for those ordinarily skilled in the relevant art, other drawings may be obtained according to the accompanying drawings without creative labor.

DETAILED DESCRIPTION

To make the object, technical solutions and advantages of the present disclosure more apparent, implementation methods of the present disclosure will be described more fully hereinafter with reference to the accompanying drawings.

Embodiment 1

Figure 1:
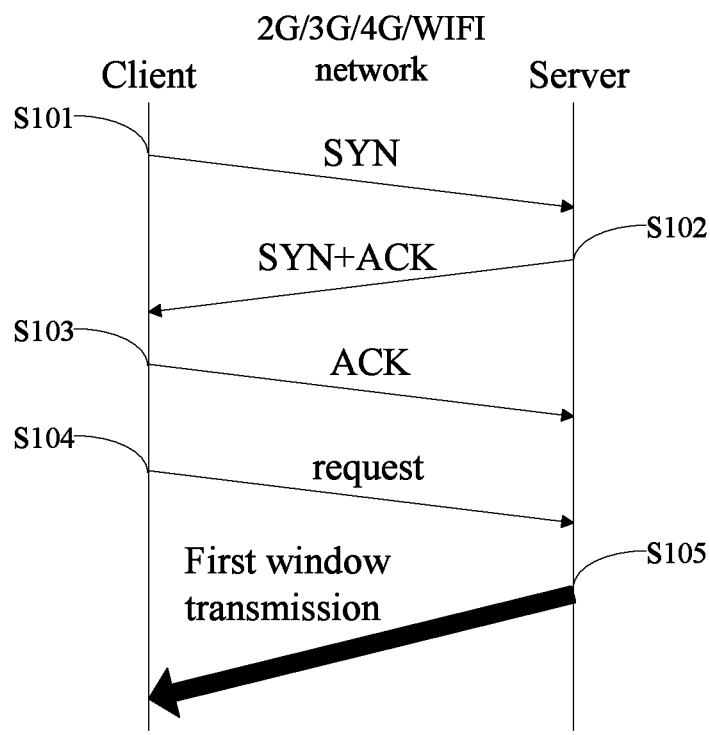
FIG. 1 illustrates a method flow chart of an existing conventional wireless network transmission.
Figure 2:
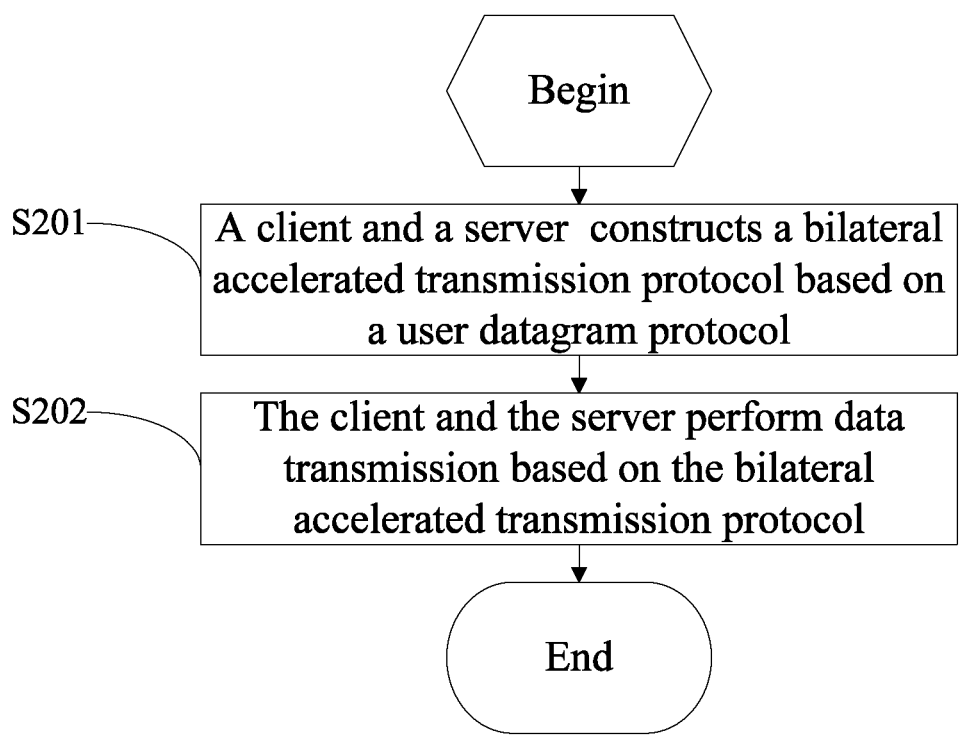
FIG. 2 illustrate a method flow chart of a wireless network bilateral accelerated transmission provided by Embodiment 1 of the present disclosure.

The present disclosure provides a wireless network bilateral accelerated transmission method, as shown in FIG. 2, the method comprises the following steps: step S201, a client and a server construct a bilateral accelerated transmission protocol based on a user datagram protocol (UDP); step S202, the client and the server perform data transmission based on the bilateral accelerated transmission protocol.

Figure 3:
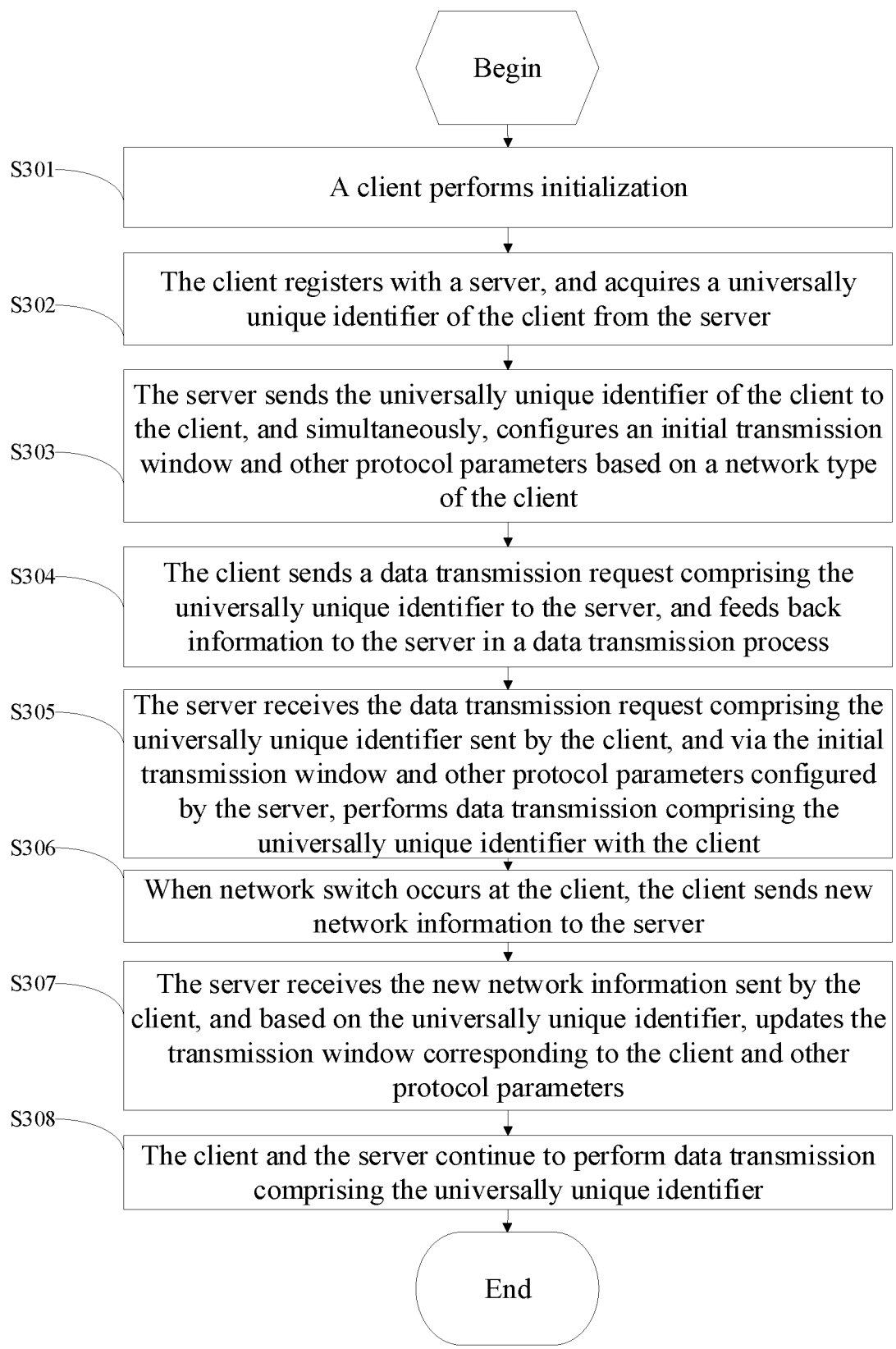
FIG. 3 illustrates a method flow chart of a wireless network bilateral accelerated transmission provided by Embodiment 2 of the present disclosure.

More specifically, as shown in FIG. 3:

Step S301, the client performs initialization. The client receives a command that starts the client and restores each parameter of the client to an initial default value, such that the entire client is in a default status to get prepared for the establishment of connection with a server. The specific item content of the initialization comprises: acquiring information of a mobile device, including the system type (Android, iOS, etc.), the internet protocol (IP) address, the physical address (MAC address, media access control address), the network type (WIFI/2G/3G/4G), the carrier type (IMSI, International Mobile Subscriber Identification Number), and the device identification number (IMEI, International Mobile Equipment Identity), etc.; and examining the configuration information, such as the server internet protocol address and port of an accelerating node, etc.

Step S302, the client registers with the server, and acquires a universally unique identifier (UUID) of the client from the server. The registration request content comprises: the system type, the network type, the carrier type, the device identification number, and the physical address, etc.

Step S303, the server sends the universally unique identifier of the client to the client and configures an initial transmission window and other protocol parameters based on the network type of the client. After receiving a registration request of the client, the server generates a globally unique identification number, namely, the universally unique identifier, to be returned to the client. The composition of the universally unique identifier comprises: current data and time, clock sequence, and a universally unique machine identification code of Institute of Electrical and Electronics Engineers (IEEE). For example, in the present embodiment, the universally unique identifier under the 2G network may be 4cdbc040-657a-4847-b266-7e31d9e2c3d9. In other embodiments, the universally unique identifiers under, for example, the 3G, 4G or the WIFI network, may be similar to that under the 2G network. The universally unique identifier may be generated based on the system type, the physical address, the device identification number, the registration time, and the random number generation algorithm of the client, the uniqueness thereof may be ensured, and the universally unique identifier may be suitable for all kinds of networks. The universally unique identifier is configured to identify such connection, and all subsequent information interaction processes between the client and the server need to carry the universally unique identifier. The server may manage a connection table, and maintain information such as the network protocol address, the port, and the network type of each client based on the universally unique identifier. In the spare time, the client and the server may have a heartbeat mechanism configured to detect whether the opposite side is alive or not.

Before data transmission starts, any transmission control protocol (TCP) connection needs to first experience the slow start stage, and the object of such stage is to detect and estimate the network bandwidth, thereby avoiding network congestion caused by sudden transmission of a large amount of data in a short period of time. In the slow start stage, first, the data amount configured by the initial window is transmitted. After receiving the acknowledgement packet (ACK) replied by the opposite side, the transmission window is enlarged, and the data continues to be transmitted. Such sending/confirming interact back and forth until packet loss occurs or the window increases to a threshold value. Shortening of such interaction process of the slow start stage has a relatively large meaning on accelerating the whole transmission process. Different wireless networks may have great variations in bandwidth and time delay. To shorten the slow start process, and simultaneously, to reduce the possibility of the occurrence of network congestion, different initial transmission windows need to be configured for connection of different network types. The transmission control protocol is a protocol implemented in the inner core layer of the system, thereby failing to configure an initial transmission window for each connection individually. Based on the construction of a reliable transmission protocol by the user datagram protocol on the application layer, the present disclosure may configure different initial transmission windows for connection of different network types. In the present disclosure, the server may configure different initial transmission windows based on different network types such as the 2G, 3G, 4G or WIFI at the client. By configuring different initial transmission windows and reducing the interaction time of the slow start stage, the available bandwidth of the network may be more fully utilized in a shorter period of time, which is particularly beneficial for enhancing the network transmission, especially the transmission of a small data amount request.

For the configuration of the initial transmission window, the 2G network may configure the initial value of the transmission window to be 10; the 3G network may configure the initial value of the transmission window to be 20; the 4G network may configure the initial value of the transmission window to be 30; and the WIFI network may configure the initial value of the transmission window to be 15.

For the configuration of other protocol parameters, the 2G network may configure the bandwidth of the slow start threshold to be approximately 200 Kbps and configure the initial value of the retransmit timeout (RTO) time to be approximately 300~1000 ms; the 3G network may configure the bandwidth of the slow start threshold to be approximately 1 Mbps and configure the initial value of the RTO time to be approximately 100~200 ms; and the 4G network may configure the bandwidth of the slow start threshold to be approximately 100 Mbps and configure the initial value of the RTO time to be within approximately 100 ms.

When the sending speed of the sending end is close to the configured slow start threshold bandwidth speed, the sending speed may need to be adjusted, the congestion packet loss needs to be avoided as much as possible, and the value of the slow start threshold bandwidth speed may be adjusted in the actual transmission process based on the network condition. The retransmit timeout time of the WIFI network is similar to that of the 4G network, and if the data packet sent by the sending end exceeds a preset retransmit timeout time and the acknowledgement packet from the opposite side is not received, retransmission may be performed. The retransmit timeout time may be adjusted based on the round-trip time (RTT) delay measured in the subsequent data transmission process. More protocol parameters may be implemented with reference to the BIC and CUBIC congestion control algorithm of the transmission control protocol.

Step S304, the client sends the data transmission request comprising the universally unique identifier to the server and feeds back information to the server during a data transmission process.

Step 305, the server receives the data transmission request comprising the universally unique identifier sent by the client, and via the initial transmission window and other protocol parameters configured by the server, performs the data transmission comprising the universally unique identifier with the client. According to the present disclosure, when establishing the connection, the protocol may refer to the three-handshake mechanism of the transmission control protocol to establish a reliable transmission connection. The connection type of the protocol in the present disclosure is long connection that always tries to maintain and multiplex the existing connection as much as possible, instead of frequently establishing and releasing the connection.

Optionally, the disclosed method further comprises:

Step S306, when the network switch occurs at the client, the client sends new network information to the server. When the access network type of the client changes, for example, the client enters the 4G network environment from the WIFI network environment or enters the 3G network from the 2G network, the client sends information to the server to notify new network information.

Step S307, the server receives the new network information sent by the client, and based on the universally unique identifier and the new network information of the client, updates, at the server, the transmission window corresponding to the client and other protocol parameters. The transmission control protocol connection is identified based on the network protocol address and the port. Once the network protocol address changes caused by network switch, connection needs to be re-established, and then the client and the server may continue to perform data interaction. This may result in the interruption of the transmission process for a certain period of time. In a network with a large time delay, the cost of re-establishment of the connection may be even higher, resulting in greater transmission delay. In the disclosed protocol, the transmission layer uses a connectionless user datagram protocol, and the application layer uses the universally unique identifier to uniquely identify the connection. Even the network switch results in a change of the network protocol address, the universally unique identifier may not change. The client may monitor the network switch event, and once network switch occurs, the server may be timely notified to update the related information at the client, thereby ensuring the seamless switch of the transmission process and reducing the transmission delay.

Step 308, the client and the server continue to perform data transmission comprising the universally unique identifier.

The disclosed protocol may configure different initial transmission windows based on the different network type of the clients, which may not be implemented by the transmission control protocol. Such protocol has a relatively good effect on enhancing the data transmission, especially for transmission of a small request, and thus may reduce the time cost of the network bandwidth detection and estimation. The network switch of the mobile terminal may be relatively frequent, and under such situation, the transmission control protocol may need to re-establish connection to continue communication. The disclosed protocol may no longer need to re-establish connection, thereby reducing the time cost of the connection re-establishment when the network switches.

Embodiment 2

Figure 4:
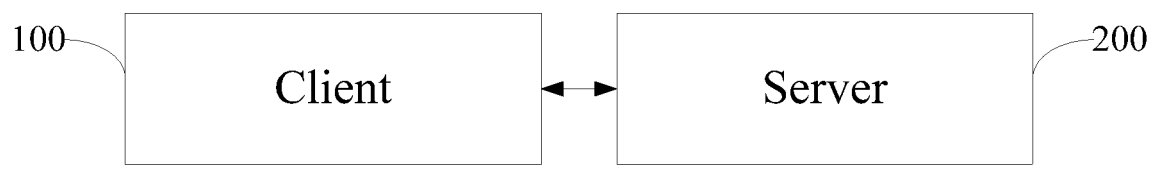
FIG. 4 illustrates a system structural view of a wireless network bilateral accelerated transmission provided by Embodiment 2 of the present disclosure.

The present disclosure further provides a wireless bilateral accelerated transmission system, as shown in FIG. 4, the system comprises a client 100 and a server 200. The client 100 and the server 200 may construct a bilateral accelerated transmission protocol based on a user datagram protocol, and further establish connection based on the bilateral accelerated transmission protocol to perform data transmission.

Figure 5:
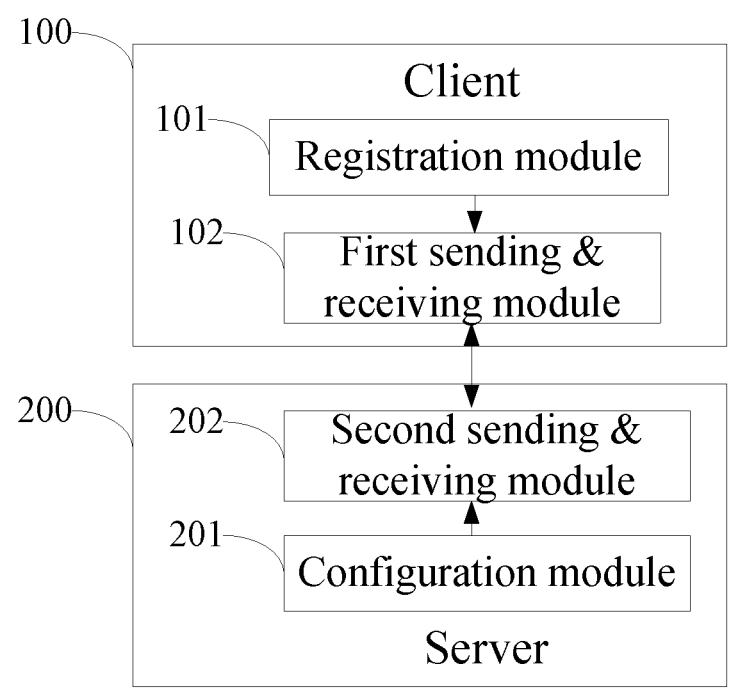
FIG. 5 illustrates a system structural view of a wireless network bilateral accelerated transmission provided by Embodiment 2 of the present disclosure.

As shown in FIG. 5, the client 100 includes a registration module 101 and a first sending & receiving module 102. The server 200 includes a configuration module 201 and a second sending & receiving module 202. The registration module 101 may further include a network sub-module, and the registration module 201 may further include a management sub-module.

When the client 100 establishes connection with the server 200, the client 100 may first perform initialization to reach an initial default status, and then the registration module 101 may collect the registration information of the client 100, including the system type, the network type, the carrier type, the device identification number, and the physical address, etc. The first sending & receiving module 102 may initiate a connection request and send the registration information of the client 100 to the second sending & receiving module 202. After receiving the connection request from the first sending & receiving module 102, the second sending & receiving module 202 receives the registration information of the client 100. The configuration module 201, based on the registration information of the client 100 received by the second sending & receiving module 202, generates the universally unique identifier of the client 100, and further sends the universally unique identifier to the first sending & receiving module 102 via the second sending & receiving module 202. Simultaneously, the transmission window and the transmission protocol parameter are configured at the server 200 based on the network type of the client 100.

After the first sending & receiving module 102 receives the universally unique identifier sent by the second sending & receiving module 202, the client 100 initiates a data transmission request carrying the universally unique identifier to the server 200 via the first sending & receiving module 102. After the second sending & receiving module 202 receives the data transmission request carrying the universally unique identifier sent by the first sending & receiving module 102, the server 200 applies traffic and congestion control mechanisms, and reliably transmits the data carrying such universally unique identifier to the client 100 via the second sending & receiving module 202. The first sending & receiving module 102 of the client 100 receives the data carrying the universally unique identifier sent by the second sending & receiving module 202 of the server 200. Similar to the transmission control protocol, the traffic and congestion control of the disclosed protocol may be primarily divided into a slow start stage and a congestion prevention stage. In the slow start state, the sending window grows rapidly until a slow start threshold value is reached or packet loss occurs. By then, the system enters the congestion prevention status, the size of the sending window may be reduced, and the packet loss information is processed. The disclosed protocol may ensure reliable transmission of the data, and process situations such as packet loss and disordered sequence. The data packet sent by the server 200 may be identified using a unique sequence number, and the client 100 may reply an acknowledgement packet after receiving the data. The server 200 adjusts the sending speed based on the information of the acknowledgement packet, counts the round-trip time delay, and determines the information of packet loss, etc.

In the transmission process, the network sub-module of the registration module 101 constantly collects the network condition information of the client 100. The first sending & receiving module 102, while receiving the data sent by the second sending & receiving module 202, constantly feeds back the transmission progress, the network signal condition, and the network type condition to the management sub-module of the configuration module 201 via the second sending & receiving module 202. The management sub-module of the module 201 may be configured to manage the related information of the client 100, comprising the transmission progress, the network environment, whether the connection status is normal or whether packet loss occurs, the packet loss rate, the retransmission ratio, the round-trip time delay, etc. The update information of the client 100 when the network switches is processed.

When the network environment where the client 100 is in changes, for example, when the client 100 enters the 4G network from the WIFI network or enters the 3G network from the 2G network, the network sub-module of the registration module 101 collects the current new network condition information, and sends the new network information to the server 200 via the first sending & receiving module 102. The management sub-module of the configuration module 201 may, after receiving the new network information via the second sending & receiving module 102, based on the new network information, re-configure the transmission window and the transmission protocol parameters that satisfy the network environment, thereby ensuring the connection between the first sending & receiving module 102 and the second sending & receiving module 202. In the present disclosure, the network information refers to the information such as the network type, the carrier information, and the internet protocol address of the client.

Figure 6:
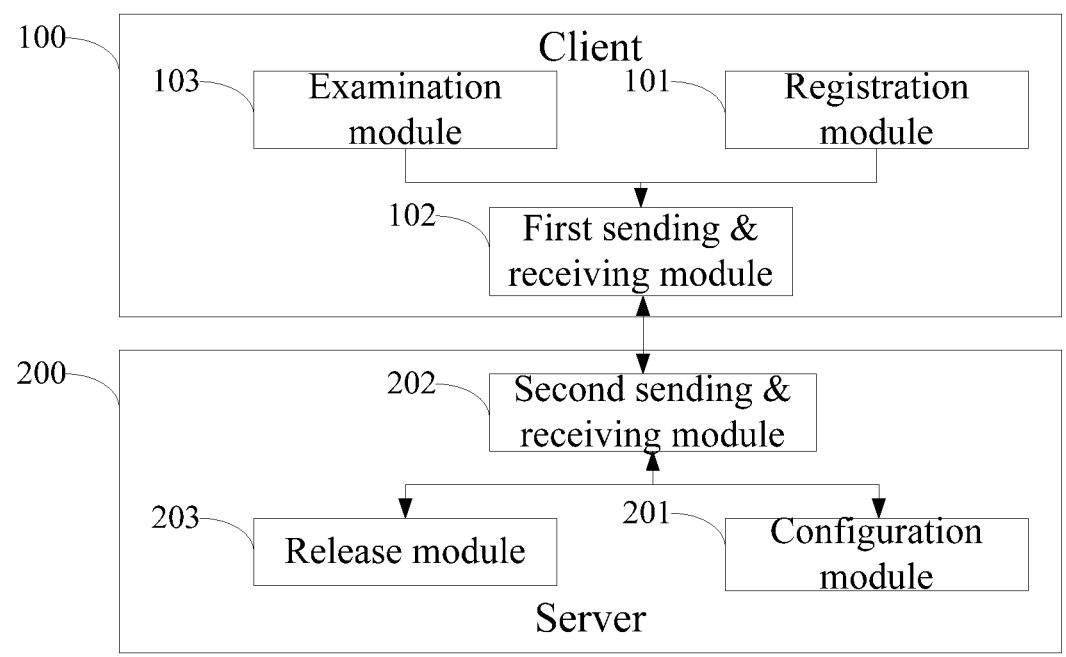
FIG. 6 illustrates a system structural view of a wireless network bilateral accelerated transmission provided by Embodiment 2 of the present disclosure.

As shown in FIG. 6, another implementation method of the disclosed system is provided. The client 100 further includes an examination module 103, and the server 200 further includes a release module 203.

The examination module 103 generates a heartbeat packet at designated time and sends the heartbeat packet to the server 200 via the first sending & receiving module 102 to prove that the client 100 is in an active status. The release module 203 determines the active status of the client 100 via the heartbeat packet received by the second sending & receiving module 202. If the second sending & receiving module 202 receives no heartbeat packet before overtime, the client 100 may be no longer in the active status. By then, the release module 203 controls the second sending & receiving module 202 to release the connection with the first sending & receiving module 102.

The numerical order of the aforementioned embodiments of the present disclosure are for descriptive purposes only, and does not represent any preference of the present disclosure.

The device embodiments described above are for illustrative purposes only, and the units illustrated as separate parts may be or may not be physically separated. The parts illustrated as units may be or may not be physical units. That is, the parts may be located in a same place, or distributed to a plurality of network units. A part of or all modules thereof may be selected to realize the object of solutions of the present disclosure based on the actual demand. Those ordinarily skilled in the relevant art may understand and implement the present disclosure without contributing creative labor.

Via the descriptions of the aforementioned embodiments, those skilled in the relevant art may clearly understand that each embodiment may be implemented using software and an essential universal hardware platform, or via the hardware. Based on such understanding, the nature of the aforementioned technical solutions or the part of the aforementioned technical solutions that contributes to the existing technique may be embodied in a form of software products. Such computer software product may be stored in a computer readable storage medium, such as ROM/RAM, magnetic disc, and optical disc, etc., that comprises a plurality of commands configured to allow a computing device (e.g., a personal computer, a server, or a network device, etc.) to execute each embodiment or methods described in some parts of the embodiments.

The aforementioned is only preferred embodiments of the present disclosure and is not configured to limit the present disclosure. Any modification, equivalent replacement, and improvement, etc. without departing from the spirit and principles of the present disclosure, shall all fall within the protection range of the present disclosure.

What is claimed is:

1. A wireless network bilateral accelerated transmission method, comprising steps of:
    constructing, by a client and a server, a bilateral accelerated transmission protocol based on a user datagram protocol; and
    performing, by the client and the server, data transmission based on the bilateral accelerated transmission protocol, wherein:
    specific steps of constructing, by the client and the server, the bilateral accelerated transmission protocol based on the user datagram protocol comprises:
        registering, by the client, with the server to acquire a universally unique identifier of the client from the server; and
        sending, by the server, the universally unique identifier of the client to the client, and configuring, by the server, an initial transmission window and other protocol parameters based on a network type of the client; and specific steps of performing data transmission, by the client and the server, based on the bilateral accelerated transmission protocol further comprises:

sending, by the client, a data transmission request comprising the universally unique identifier to the server, and feed backing, by the client, information to the server during a data transmission process; and receiving, by the server, the data transmission request comprising the universally unique identifier sent by the client, and via the initial transmission window and other protocol parameters configured by the server, performing, by the server, data transmission comprising the universally unique identifier with the client, and the wireless network bilateral accelerated transmission method further comprises:

when network switch occurs at the client, sending, by the client, new network information to the server;

receiving, by the server, the new network information sent by the client, and based on the universally unique identifier of the client and the new network information, updating, by the server, a transmission window corresponding to the client and other protocol parameters at the server; and continuing to perform, by the client and the server, data transmission comprising the universally unique identifier.

2. The wireless network bilateral accelerated transmission method according to claim 1, wherein:

a method of configuring the initial transmission window is: for different network types, the initial transmission window is configured to have different values; for a 2G network, an initial transmission window value is configured to be 10; for a 3G network, an initial transmission window value is configured to be 20; for a 4G network, an initial transmission window value is configured to be 30; and for a WIFI network, an initial transmission window value is configured to be 15, and other protocol parameters comprise: a slow start threshold value and an initial value of retransmit timeout time.

3. A wireless network bilateral accelerated transmission system, comprising: a client and a server, the client and the server constructing a bilateral accelerated transmission protocol based on a user datagram protocol and further establishing a connection based on the bilateral accelerated transmission protocol to perform data transmission, wherein:

the server manages, based on a universally unique identifier, a connection table and maintain information including a network protocol address, a port, and a network type of the client.

4. The wireless network bilateral accelerated transmission system according to claim 3, wherein the client comprises:

a registration module, configured to collect information of the client and register with the server; and a first sending & receiving module, connected to the registration module, and configured to send information to the server and receives the information sent to the client by the server.

5. The wireless network bilateral accelerated transmission system according to claim 4, wherein the server comprises:

a configuration module, configured to process registration information of the registration module, generate the universally unique identifier of the client, and configure an initial transmission window and transmission protocol parameters based on a network type of the client; and a second sending & receiving module, connected to the configuration module and the first sending & receiving module of the client, and configured to receive information sent to the server by the client and send information to the client.

6. A wireless network bilateral accelerated transmission system, comprising: a client and a server, the client and the server constructing a bilateral accelerated transmission protocol based on a user datagram protocol and further establishing a connection based on the bilateral accelerated transmission protocol to perform data transmission, wherein:

the client comprises:

a registration module, configured to collect information of the client and register with the server; and a first sending & receiving module, connected to the registration module, and configured to send information to the server and receives the information sent to the client by the server, and the server comprises:

a configuration module, configured to process registration information of the registration module, generate the universally unique identifier of the client, and configure an initial transmission window and transmission protocol parameters based on a network type of the client; and a second sending & receiving module, connected to the configuration module and the first sending & receiving module of the client, and configured to receive information sent to the server by the client and send information to the client, and the registration module further comprises a network sub-module configured to recognize network type information of the client; and the configuration module further comprises a management sub-module configured to manage information of the client and process update information when the network switches at the client.

7. The wireless network bilateral accelerated transmission system according to claim 6, wherein:

the client further comprises an examination module, connected to the first sending & receiving module, and configured to generate a heartbeat packet at designated time and send the heartbeat packet to the server via the first sending & receiving module; and the server further comprises a release module, connected to the second sending & receiving module, and configured to determine an active status of the client based on the heartbeat packet, and if the heartbeat packet is not received before overtime, the second sending & receiving packet releases connection with the first sending & receiving module.

* * * * *